US011731781B2

(12) United States Patent
Guering et al.

(10) Patent No.: US 11,731,781 B2
(45) Date of Patent: Aug. 22, 2023

(54) AIRCRAFT CABINET COMPRISING AT LEAST ONE FLIGHT-DATA DISPLAY SCREEN AND AT LEAST ONE AVIONICS MODULE

(71) Applicant: Airbus Operations SAS, Toulouse (FR)

(72) Inventors: Bernard Guering, Montrabe (FR); Romain Delahaye, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 380 days.

(21) Appl. No.: 16/814,513

(22) Filed: Mar. 10, 2020

(65) Prior Publication Data
US 2020/0346782 A1 Nov. 5, 2020

(30) Foreign Application Priority Data
Mar. 12, 2019 (FR) ...................................... 1902498

(51) Int. Cl.
*B64D 43/00* (2006.01)
*B64D 11/00* (2006.01)

(52) U.S. Cl.
CPC ...... *B64D 43/00* (2013.01); *B64D 2011/0046* (2013.01)

(58) Field of Classification Search
CPC . B60R 11/0229; B64D 11/0689; B64D 43/00; B64D 45/00; B64D 2045/0075
See application file for complete search history.

(56) References Cited

U.S. PATENT DOCUMENTS

| 5,116,117 A | * | 5/1992 | Miyashita | G03B 21/28 359/449 |
| 5,205,502 A | * | 4/1993 | Hill | G01P 1/07 73/431 |
| 5,568,963 A | * | 10/1996 | Bennett | G09F 19/18 312/10.1 |
| 5,786,995 A | * | 7/1998 | Coleman | B64D 43/00 700/83 |
| 7,808,403 B2 | * | 10/2010 | Pouzolz | G01D 3/10 340/975 |
| 8,743,020 B1 | * | 6/2014 | Mazuk | G06F 3/14 345/1.1 |

(Continued)

FOREIGN PATENT DOCUMENTS

| FR | 2458463 A1 | 1/1981 |
| FR | 2991295 A1 | 12/2013 |

(Continued)

OTHER PUBLICATIONS

French Search Report; priority document.

*Primary Examiner* — William Lu
(74) *Attorney, Agent, or Firm* — Greer, Burns & Crain, Ltd.

(57) ABSTRACT

A cabinet comprising at least one screen allowing display of data necessary for a flight-control of an aircraft connected to at least one avionics module for management of the data. The screen at least partially forms one of the sides of the cabinet and the module or modules are installed inside the cabinet. The cabinet has a base allowing the screen or screens to be placed at a desired height. As a result, a length of cable between screen and avionics modules is reduced to a minimum.

14 Claims, 3 Drawing Sheets

(56) References Cited

U.S. PATENT DOCUMENTS

| | | | | |
|---|---|---|---|---|
| 9,302,779 B2* | 4/2016 | Zaneboni | | B64D 43/00 |
| 9,592,771 B2* | 3/2017 | Guering | | B64D 45/00 |
| 9,665,345 B2* | 5/2017 | McCullough | | B64D 43/00 |
| 10,614,653 B2* | 4/2020 | Yukimura | | G07F 17/3211 |
| 11,263,916 B2* | 3/2022 | Best | | G09B 9/05 |
| 2004/0051645 A1* | 3/2004 | Mahloch | | H05B 6/6414 |
| | | | | 219/522 |
| 2005/0190533 A1* | 9/2005 | Hultzman | | E05D 11/08 |
| | | | | 16/221 |
| 2005/0225217 A1* | 10/2005 | Nay | | G06F 1/183 |
| | | | | 312/208.1 |
| 2005/0258321 A1* | 11/2005 | Worrall | | F16M 11/046 |
| | | | | 248/201 |
| 2006/0131253 A1* | 6/2006 | Richardson | | A47F 5/00 |
| | | | | 211/189 |
| 2006/0238511 A1* | 10/2006 | Gyde | | G08G 5/0021 |
| | | | | 345/168 |
| 2008/0094255 A1* | 4/2008 | Bethel | | B64D 43/00 |
| | | | | 340/971 |
| 2008/0113708 A1* | 5/2008 | Beadell | | A63F 13/30 |
| | | | | 463/31 |
| 2009/0253486 A1* | 10/2009 | Nagano | | G07F 17/3211 |
| | | | | 463/20 |
| 2009/0266778 A1* | 10/2009 | Garcia | | G09F 7/18 |
| | | | | 211/89.01 |
| 2013/0043359 A1* | 2/2013 | Kirsch | | H05K 7/1412 |
| | | | | 248/231.51 |
| 2013/0126671 A1* | 5/2013 | Guering | | B64D 11/0691 |
| | | | | 244/118.6 |
| 2014/0111448 A1* | 4/2014 | Moses | | G06F 1/1601 |
| | | | | 345/173 |
| 2014/0175220 A1* | 6/2014 | Durand | | B64C 1/1476 |
| | | | | 244/118.5 |
| 2014/0175221 A1* | 6/2014 | Zaneboni | | B64D 11/00 |
| | | | | 244/118.6 |
| 2014/0209740 A1* | 7/2014 | Guering | | B60R 11/0229 |
| | | | | 361/679.01 |
| 2016/0256785 A1* | 9/2016 | Sum | | G07F 17/3202 |
| 2016/0335836 A1* | 11/2016 | Castro | | F16M 11/041 |
| 2018/0020567 A1* | 1/2018 | Kinard | | H05K 7/1417 |
| 2018/0089935 A1* | 3/2018 | Froy, Jr. | | G07F 17/3225 |
| 2019/0039867 A1* | 2/2019 | Urban | | F16M 11/18 |
| 2019/0321981 A1* | 10/2019 | Bosworth | | B25J 9/04 |
| 2021/0001997 A1* | 1/2021 | Eltohamy | | B64D 43/00 |

FOREIGN PATENT DOCUMENTS

| | | | | |
|---|---|---|---|---|
| FR | 2999526 A1 * | 6/2014 | | B64C 1/1476 |
| FR | 3000028 A1 | 6/2014 | | |
| WO | 9821093 A2 | 5/1998 | | |
| WO | WO-2013045861 A1 * | 4/2013 | | B60R 11/0229 |

* cited by examiner

AIRCRAFT CABINET COMPRISING AT LEAST ONE FLIGHT-DATA DISPLAY SCREEN AND AT LEAST ONE AVIONICS MODULE

CROSS-REFERENCES TO RELATED APPLICATIONS

This application claims the benefit of the French patent application No. 1902498 filed on Mar. 12, 2019, the entire disclosures of which are incorporated herein by way of reference.

FIELD OF THE INVENTION

The present application relates to the field of structures for supporting the equipment that process and display data required for flying an aircraft. The present application also relates to an aircraft equipped with such structures The present invention relates to the field of transport aircraft and notably passenger transport aircraft and/or transporters carrying goods.

BACKGROUND OF THE INVENTION

The flight deck is the space reserved for the pilots. It is commonly found in the cockpit traditionally at the front of the fuselage in the upper region of the nose equipped with large front and side windows that offers the pilots a direct view on the external environment. The cockpit contains all the controls (controls for actuating the control surfaces and other high-lift flaps, the landing gear, the brakes, etc.) and the instruments needed for flying, such as screens allowing the display of flight data. This collection of controls and instruments will be referred to hereinafter as flight equipment. The screens face the pilot in the cockpit. The structures for holding the screens at the level of the pilot are often bulky, complex and heavy. They have to support the electric wiring harnesses, the data transport cables and the ventilation ducts that allow the operation of the screens.

All of the data necessary for flying, referred to hereinafter as avionics data, are stored in enclosures or cabinets containing computers, boards, power modules or any other electronic and/or electrical equipment. These enclosures are conventionally arranged vertically and made up on the basis of a load-bearing chassis on which horizontal shelves are mounted. The electrical and mechanical connections are made using racks. The cabinets are sited remotely from the cockpit in what is referred to as an avionics bay situated in the lower part of the fuselage underneath the floor that supports the flight deck and the passengers, and, for example, in the nose, underneath the cockpit. Given the quantity of data to be stored and processed, the cooling and ventilation devices required, the need for access in order to carry out maintenance operations, operations of checking and replacing or repairing components, there is not enough space in the cockpit zone to install and maintain these. There is therefore a long length of cabling to transport the data from the enclosures in the avionics bay to the controls, screens or other equipment in the cockpit.

Patent application FR3000028 filed on 19 Dec. 2013 by AIRBUS SAS discloses a flight deck that is sited remotely, namely away from the upper region of the nose and, for example, in a bay. As a result, the flight deck is closer to the avionics bay and reduces the lengths of cable.

SUMMARY OF THE INVENTION

It is an object of the present invention to propose an aircraft cabinet that makes it possible to further improve the proximity between the flight-control screens and avionics modules.

To that end, the present invention relates to a cabinet for aircraft, characterized in that it comprises at least one screen allowing the display of data necessary for the flight-control of the aircraft connected to at least one avionics module for the management of the data, the screen at least partially forming one of the sides of the cabinet and the module or modules being installed inside same, the cabinet having a base allowing the screen or screens to be placed at a desired height.

In this way, the avionics modules are as close as possible to the flight-control screens in a holding structure that is very simple.

The invention provides at least one of the following optional features, considered in isolation or in combination.

At least one screen is removable so as to allow access to at least one avionics module.

The avionics module or modules is (or are) placed behind at least one screen allowing access to all of the module(s).

In the case of a plurality of avionics modules, the avionics modules take the form of parallelepipedal units which are juxtaposed on a horizontal plane.

At least one screen is articulated for rotation about one of the edge corners of the cabinet.

One part of the screens forms a flight-data display device and another part of the screens forms a device for displaying the environment external to the aircraft.

The cabinet comprises two screens at different vertical levels.

The upper screen is in a vertical plane and the lower screen in an inclined plane.

Controls are fixed to or incorporated into the base.

The base comprises a compartment for the storage of aircraft equipment.

The invention also relates to an aircraft comprising a flight deck comprising at least one cabinet having one or more of the above features.

The flight deck may be sited remotely with respect to the upper forward part of the aircraft.

BRIEF DESCRIPTION OF THE DRAWINGS

Further objects, features and advantages will become apparent from the following description of the invention, which description is given by way of nonlimiting example only, with reference to the attached drawings in which.

DETAILED DESCRIPTION OF THE PREFERRED EMBODIMENTS

Figure 1:
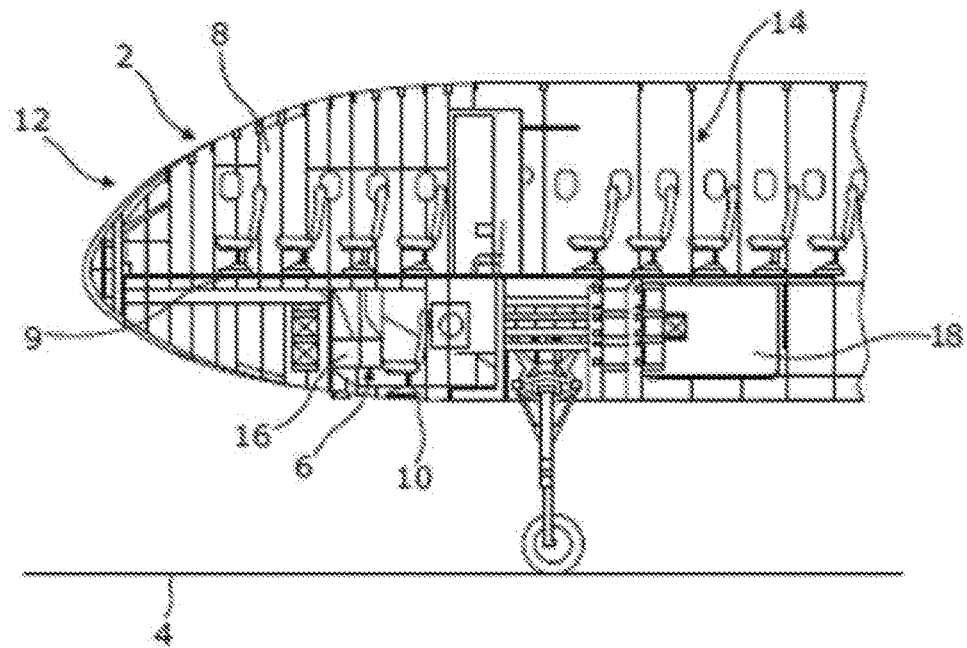
FIG. 1 is a schematic side view in longitudinal section of a forward part of an aircraft according to the present invention.

The present invention notably applies to the field of the transport of passengers or freight, particularly in the field of aeronautics. The vehicle 2 given by way of illustration in the description which follows is an aircraft intended for the commercial carrying of passengers. The present invention could be applied to other fields and relate for example to a transporter aircraft carrying freight.

It will be assumed that the aircraft 2 is resting on horizontal ground 4 and that any plane parallel to the ground is horizontal and any plane perpendicular to the ground is vertical. The terms lower and upper are considered with reference to this vertical direction.

The present invention relates to a flight deck 6 sited remotely with respect to the forward upper part 8 of the aircraft (above the floor 9 separating the cockpit from the avionics bay 10) conventionally housing the cockpit. More specifically in the example illustrated, the flight deck is sited remotely in the avionics bay 10 referred to more commonly as the "electric and electronic bay." This zone is situated in the nose 12 underneath the cockpit and partially under the floor 9 of the space dedicated to the passenger cabin 14. Any other sufficiently spacious zone providing access to the cabinets 16 in order to restore and maintain them might be suitable, such as part of the baggage hold 18 for example.

The flight deck 6 comprises at least one cabinet 16, also referred to as an enclosure, a bay or by any other term referring to a structure able to contain elements such as electrical and electronic equipment. The cabinet or cabinets 16 are placed within sight of the pilot, in a zone across which he can sweep his gaze by turning his head from one side to the other while sitting in his seat 17. In the embodiment illustrated in FIGS. 2 and 3, five cabinets are provided and are placed juxtaposed with one another around the pilot, along a curved line A. In the embodiment illustrated in FIGS. 4 and 5, one single cabinet is provided of a size that allows positioning on the same curved line A as before.

The cabinet 16 offers a structural framework and an external casing 20 making it possible to enclose the volume to hold and protect the avionics modules 22. The avionics module 22 combines under this heading various electrical and/or electronic equipment (electrical cores, computers, etc.) dedicated to the processing and storage of data necessary for flying, referred as avionics data. The cabinet 16 also houses the interconnections between the equipment items and the cooling and ventilation systems (ducts, couplings, etc.) and possibly instruments of all kinds such as temperature sensors. The cabinet allows the flight equipment in the broad sense to be at least partially gathered together.

The cabinet 16 comprises at least one screen 24 allowing the display of data needed for flying the aircraft (referred as seen earlier as avionics data), and at least one avionics module 22 for the management of the data and to which it is connected, the screen or screens 24 at least partially forming one of the sides of the cabinet and the module or modules 22 being installed inside same, the cabinet 16 having a base 26 allowing the screen or screens 24 to be placed at a desired height. More specifically, the cabinet 16 comprises at least two parts:

a first part delimiting a storage and display compartment 28 in which the avionics module or modules 22 are housed and one of the faces of which bears the flight-control screens 24, and a supporting second part forming the base 26 of the cabinet and also able to be used as a storage compartment.

In the embodiments illustrated in the figures, the cabinet 16 comprises vertically two screens 24 at different vertical levels. The screens 24 are juxtaposed vertically to ensure visual continuity from one screen to the other if necessary, or not. One of the screens 30 forms a device for displaying the environment external to the aircraft, and the other screen 32 forms a flight-data display device. The upper screen 30 situated at the higher level relays pictures of the external environment. The pilot thus finds himself with a display of the external environment at eye level and a sensation close to that of a conventional cockpit with a view to the outside of the aircraft through the windows. The pilot may select the image or images he wishes to view on the upper screen or on each screen 30, 32 if there are several of these as in the present forms of embodiment illustrated. Cameras are positioned on the outside and/or the inside of the aircraft to take pictures which are displayed in real time on the upper screen 30. The external cameras may, for example, take pictures that reconstruct the external environment or else may focus on precise zones in order to avoid collisions. The interior cameras may allow the pilot to monitor what is happening in the cabin, such as attacks or fire or other problems. Augmented reality technology can be used to improve the viewing comfort of the pilot. The lower screen 32 displays the flight data. Any other way of arranging the images displayed on the screens 30, 32 is conceivable.

According to the embodiments illustrated, the upper screen 30 is in a vertical plane and the lower screen 32 in a plane that is inclined with respect to the vertical plane.

The storage and display compartment 28 of the cabinet may exhibit any type of shape that allows it to support at least one screen 24 for displaying to the pilot. Behind the screen 24 and inside the compartment 28 are stored the avionics modules 22 (or the avionics module in the case of just one module). The screen 24 is connected to the cabinet in such a way as to render it removable and allow access to the avionics modules 22. In this way, once the screen 24 has been removed, retracted or else moved, it allows access to the avionics module or modules in order to install, replace, remove or maintain same. In the embodiment illustrated, the avionics modules 22 take the form of parallelepipedal units and, more specifically, in the form illustrated, of boards positioned vertically parallel to one another and juxtaposed on a horizontal plane. It is thus easy to insert or remove any arbitrary card to which direct access is provided.

The second part is a base 26 forming a pedestal for the first part. The second part supports the first. In this way, as is seen earlier, the screens supported by the first part are at the desired height, for example at a height that allows an appropriate display of the data to the pilot.

One or more controls 34 is or are fixed to or incorporated into the base 26. The base, as was seen earlier, also comprises a storage compartment for storing pilot-controlled equipment or miscellaneous equipment such as the pilot's oxygen mask.

A number of embodiments are described in greater detail in the remainder of the description.

Figure 2:
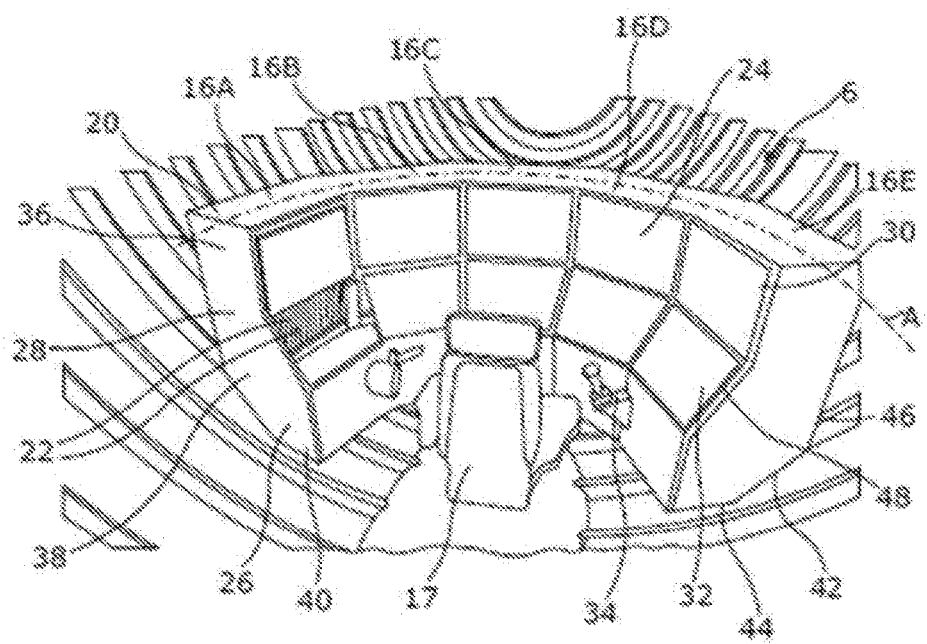
FIG. 2 is a schematic perspective depiction of a remote flight deck viewed from the rear thereof and comprising several cabinets according to the present invention, of which one has a screen in an open position.
Figure 3:
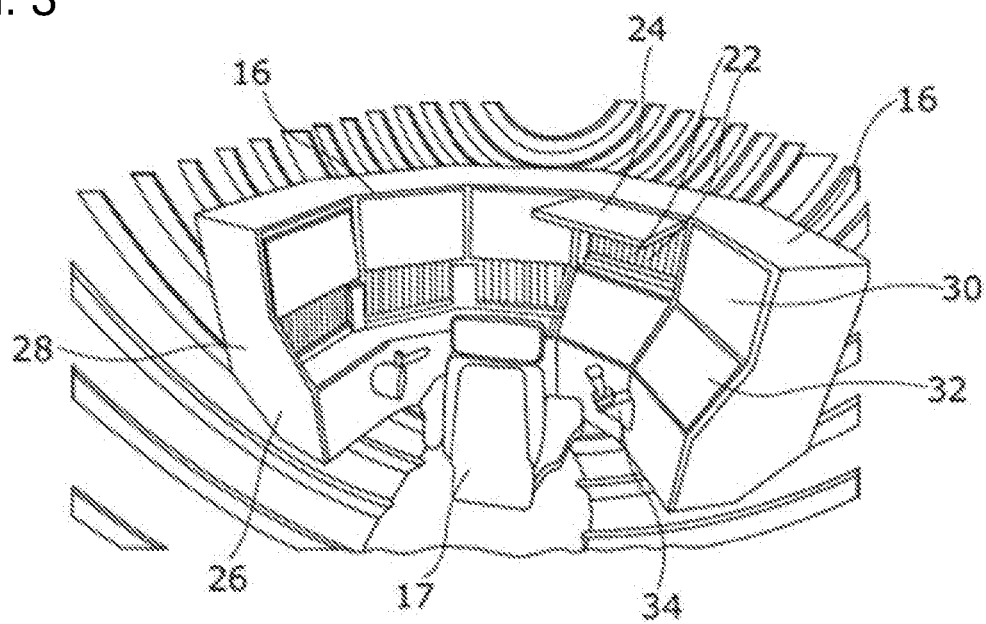
FIG. 3 is the same depiction of the flight deck of FIG. 2, in which several screens are in the open position.

According to the embodiments of FIGS. 2 and 3, several cabinets 16A to 16E, in this instance five, are positioned one behind the other and, more precisely, one against the other, in juxtaposition, so as to be positioned facing and to the sides of the seat 17 and at least partially surrounds same. A central cabinet 16C faces the seat 17 longitudinally and two other cabinets are positioned one on each side of the central cabinet. As is seen above, the cabinets follow the curved line A. According to one possible embodiment, the elements that constitute the cabinet are joined together or assembled with one another in such a way as to give the cabinet mechanical cohesion that allows it to be handled as a single object or physical entity, when it is being installed in the aircraft.

Figure 4:
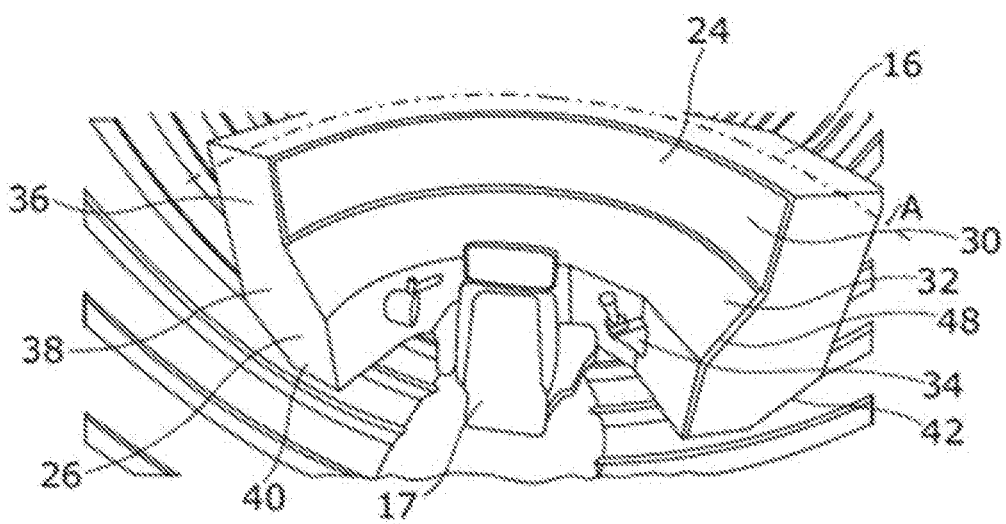
FIG. 4 is a schematic perspective depiction of another form of embodiment of the flight deck in that of FIGS. 2 and 3, comprising just one single cabinet.
Figure 5:
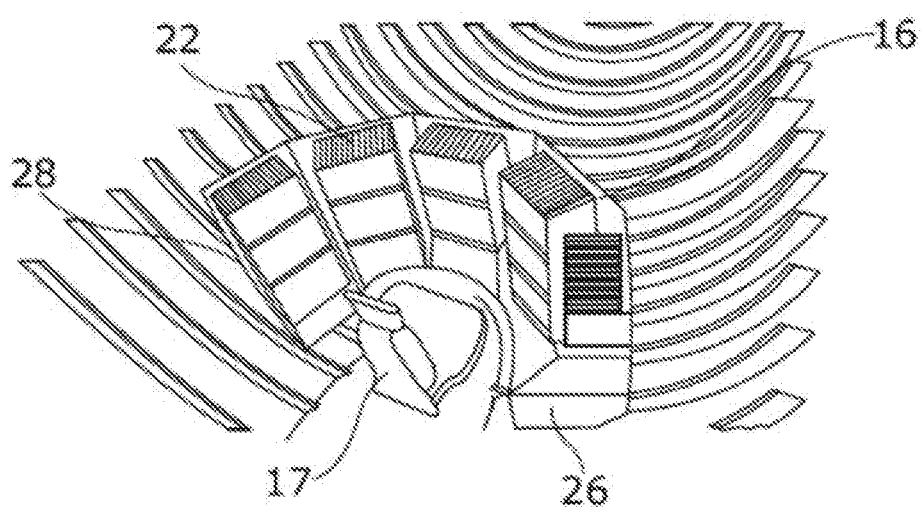
FIG. 5 is the same depiction of the flight deck of FIG. 4, in which the avionics modules are depicted with transparency.

As shown by FIGS. 4 and 5, in order to ensure this cohesion homogeneously, according to another possible form, the cabinet 16 may be combined into a single cabinet of a shape such that it offers the functionalities set out hereinabove while also making it possible to at least partially surround the pilot. The cabinet exhibits curvature along the line A.

In the embodiments of FIGS. 2 and 3, the first and second parts are made up of three units 36 to 40 arranged vertically one above the other: two, upper 36 and intermediate 38, units forming the first part and respectively supporting a vertical upper screen 30 and an inclined lower screen 32, and a lower unit 40 forming the second part. The upper unit 36 is a unit of revolution with a rectangular longitudinal cross section. The lower unit 40 is also a unit of revolution with a specific cross section; specifically, at the rear it has a part able to follow the contours of the aircraft fuselage. In the form illustrated, it adopts the form of a face 42 that is inclined between the horizontal lower face 44 and the vertical rear face 46. The upper unit 36 has dimensions that are identical in terms of width but smaller in terms of depth/length than those of the lower unit 40. Their heights are dependent on the heights and sizes desired particularly for the screens. The intermediate unit 38 adopts a shape that allows it to make the connection between the upper unit 36 and lower unit 40 while at the same time having a face 48 that is inclined for the inclined lower screen 32. Thus, its horizontal upper face geometrically corresponds to that of the horizontal lower face of the upper unit 36 and its horizontal lower face geometrically corresponds to that of the horizontal upper face of the lower unit 40. The vertical faces of the three units 36, 38 and 40 on the three sides that do not bear the screens 30, 32 adjoin one another and are situated in the one same vertical plane so as to form a single same surface.

As depicted in FIG. 3, the screen 30, 32 is articulated for rotation about a horizontal axis situated at the edge corner of the horizontal upper face of the respectively upper 36 and intermediate 38 unit lying in the plane of the screen 30, 32. The screen 30, 32 opens from the bottom upwards. The cabinet 16 comprises locking systems of known type for immobilizing the screen in a position that allows access to the avionics modules.

In the embodiments illustrated in FIGS. 4 and 5, the cabinet is made up of a single unit. It has the two parts described above. The first part comprises two vertically juxtaposed screens 30, 32. The two screens 30, 32 in this case are large panoramic screens that are broken up (to allow rotation and access to the avionics modules) at least partially surrounding the seat 17.

FIG. 5 shows by transparency that the avionics modules 22 in the form of boards can be juxtaposed vertically in addition to being juxtaposed horizontally in the first part.

Because the avionics modules have been integrated directly into the structure supporting the screens, the cabinet proposed makes it possible to offer easy access for maintenance simply by moving the screens. All of the maintenance relating to the avionics modules, to the displays, to the interfaces is gathered into one and the same single cabinet. The routing length and wiring harnesses between screens and avionics modules are reduced to a minimum and so too is their weight accordingly. The base of the cabinet offers an additional volume for storing various items within reach of the pilot.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cabinet for aircraft comprising:
    at least one screen allowing the display of data necessary for flying the aircraft, the at least one screen forming a side of the cabinet so as to define a compartment within the cabinet, and,
    at least one avionics module for management of said data connected to the at least one screen, the at least one module being installed inside the compartment of the cabinet,
    the cabinet having a base configured to allow the at least one screen to be placed at a desired height,
    wherein the at least one screen is removable so as to allow access to the at least one avionics module, and,
    wherein each time the at least one screen is moved relative to the compartment, the compartment is opened.

2. The cabinet according to claim 1, wherein the at least one avionics module is placed behind the at least one screen allowing access to said module.

3. The cabinet according to claim 1, wherein, the at least one avionics module comprises a plurality of avionics modules, the avionics modules are formed as of parallelepipedal units which are juxtaposed on a horizontal plane.

4. The cabinet according to claim 1, wherein the at least one screen is articulated for rotation about an edge corner of the cabinet.

5. The cabinet according to claim 1, wherein one part of the screens forms a flight-data display device and wherein another part of the screens forms a device for displaying an environment external to the aircraft.

6. The cabinet according to claim 1, wherein the cabinet comprises two screens at different vertical levels.

7. The cabinet according to claim 6, wherein an upper screen is in a vertical plane and a lower screen is in a plane inclined from vertical.

8. The cabinet according to claim 1, wherein controls are fixed to or incorporated into the base.

9. The cabinet according to claim 1, wherein the base comprises a compartment for a storage of aircraft equipment.

10. An aircraft comprising a flight deck comprising at least one cabinet according to claim 1.

11. The aircraft according to claim 10, wherein the flight deck is sited remotely with respect to an upper forward part of the aircraft.

12. The cabinet according to claim 1, wherein the at least one screen is configured to display an external environment of the aircraft.

13. The cabinet according to claim 12, wherein the external environment of the aircraft is displayed above the data necessary for flying the aircraft.

14. A flight deck of an aircraft sited remotely with respect to an upper forward part of the aircraft, the flight deck comprising:

- a cabinet with a screen configured to display in a first part data necessary for flying the aircraft and to display in a second part an external environment of the aircraft, the screen forming a side of the cabinet so as to define a compartment within the cabinet, and,
- at least one avionics module for management of said data connected to the at least one screen, the at least one module being installed inside the compartment of the cabinet,
- the cabinet having a base configured to allow the at least one screen to be placed at a desired height,
- wherein the screen is removable so as to allow access to the at least one avionics module, and,
- wherein each time the screen is moved relative to the compartment, the compartment is opened,
- and wherein the second part is positioned above the first part.

\* \* \* \* \*